United States Patent [19]

Heimhard et al.

[11] Patent Number: 5,051,166
[45] Date of Patent: Sep. 24, 1991

[54] SOIL RINSING APPARATUS

[75] Inventors: Hans-Jürgen Heimhard, Nülheim-Saarn; Manfred Bräuer, Bensheim, both of Fed. Rep. of Germany

[73] Assignee: Klöckner Oecotec GmbH, Fed. Rep. of Germany

[21] Appl. No.: 426,904

[22] Filed: Oct. 26, 1989

[30] Foreign Application Priority Data

Oct. 27, 1988 [DE] Fed. Rep. of Germany ....... 3836627

[51] Int. Cl.$^5$ .............................................. B07B 1/40
[52] U.S. Cl. ................................... 209/269; 209/313; 209/380
[58] Field of Search ............... 209/268, 269, 272, 273, 209/313, 314, 380, 235, 250, 254, 261, 267; 134/109–111

[56] References Cited

U.S. PATENT DOCUMENTS

| 362,766 | 10/1887 | McKeen | 209/314 |
| 1,183,805 | 5/1916 | Downerd | 209/268 |
| 2,826,370 | 3/1958 | Weston | 209/268 X |
| 4,428,505 | 1/1984 | Casey et al. | 222/64 |

FOREIGN PATENT DOCUMENTS

| 724267 | 7/1942 | Fed. Rep. of Germany. | |
| 3431147 | 3/1986 | Fed. Rep. of Germany | 209/268 |
| 100421 | 1/1962 | Netherlands | 209/269 |

Primary Examiner—Donald T. Hajec
Attorney, Agent, or Firm—Lowe, Price, LeBlanc and Becker

[57] ABSTRACT

A soil rinsing apparatus includes a rinsing and sieving element with two successive sieve regions for rinsing and sieving the soil. Water is supplied in order to reduce the soil to slime and to separate harmful substances from the soil. In order to reduce the water consumption and to improve the soil processing quality fresh water is supplied to the first sieve section and water leaving the first sieve section is collected and fed to the second sieve section which precedes the first sieve section.

3 Claims, 2 Drawing Sheets

SOIL RINSING APPARATUS

FIELD OF THE INVENTION

The invention relates to a soil rinsing apparatus with two successive rinsing or sieving sections.

The German Patent Specification 724 267 discloses an apparatus for removing liquid from processed products which comprises two successive sections each having a water supply region and an adjacent sieve for draining off water. Above the sieve region the water is separated from the bulk material as far as possible.

SUMMARY OF THE INVENTION

It is an object of the invention to provide an improved soil rinsing apparatus.

It is a further object to provide a soil rinsing apparatus achieving a high degree of purification of the soil to be processed with a substantially constant fresh water consumption.

It is a still further object of the invention to provide a soil rinsing apparatus which considerably reduces the fresh water consumption at substantially a constant degree of purification.

In order to achieve the above-mentioned objects the invention provides a soil rinsing apparatus comprising a rinsing and sieving means having soil supply means at the inlet and soil discharge means at the outlet, a first outlet side sieve region with a used water collector arranged therebelow, a first water supply region preceding the first sieve region in direction from inlet to outlet and having a fresh water supply, a second sieve region preceding the first sieve region, a further water supply region preceding the second sieve region and having a second water supply, an outlet of the water collector being connected with the second water supply for supplying used water thereto and contiguous movable floor means of a predetermined shape that generally rises in the direction of soil movement from said inlet to said outlet, with said first and second sieve regions and said first and second water supply regions being arranged thereon, for transporting said soil from said inlet to said outlet by a shaking movement.

BRIEF DESCRIPTION OF THE DRAWINGS

Further advantages, features and objects of the invention will stand out from the following description of exemplary embodiments with reference to FIGS. 1 and 2 which show partially sectional views of the soil rinsing apparatus, each in schematic representation.

DESCRIPTION OF THE PREFERRED EMBODIMENT

Figure 1:
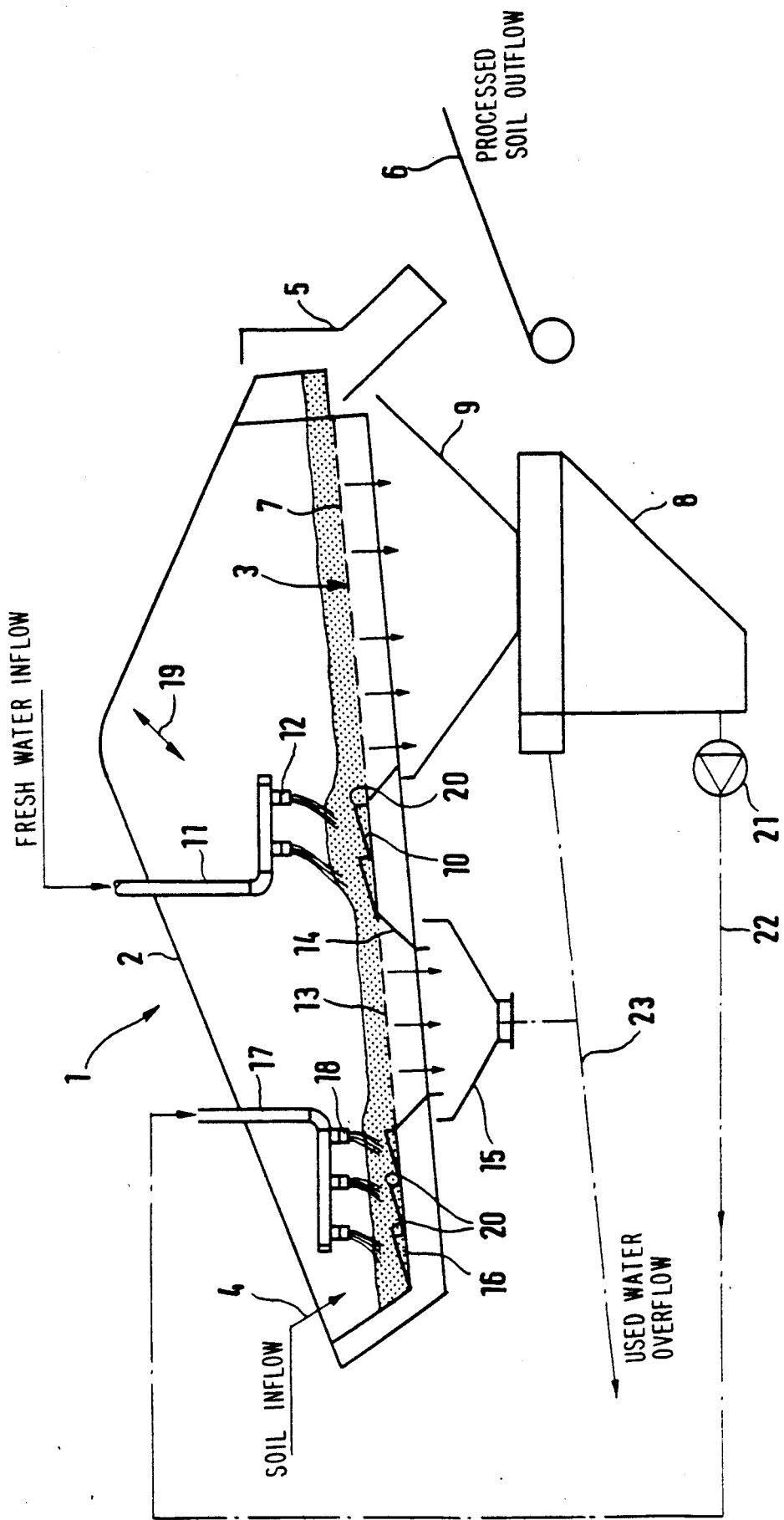

As illustrated in FIG. 1, preferred embodiment of the apparatus comprises a rinsing and sieving means 1 having a casing 2. Within the casing 2, a movable floor 3 extends from an inlet side towards an outlet side in a slightly upwardly inclined manner. A schematically indicated supply means 4 for the soil to be processed is provided at the inlet above the floor and a schematically indicated discharge means 5 for discharging the processed soil onto transport means 6 is provided at the outlet.

In a preferred embodiment, per FIG. 1, the movable floor 3 includes a large-sized first sieve region 7 adjacent the outlet side and a hopper 9 arranged therebelow and leading to a water collecting tank 8. A closed or impermeable floor section 10 forming a first water supply region is provided preceding or in front of the first sieve region. Above the floor section 10 there is a fresh water supply 11 comprising discharge nozzles 12 arranged above the floor and directed such that soil lying on the floor section 10 is reduced to slime by means of the impinging water jet.

Preceding or in front of the floor section 10 there is a second sieve region 13 having a bottom side leading through a hopper 14 to a collecting tank 15. First and second seive regions 7 and 13 are substantially coplanar, as best seen in FIG. 1. A closed or impermeable floor section 16 forming a second water supply region is provided at the inlet side preceding or in front of the second sieve region 13. A second water supply 17 is disposed above the floor section 16 and comprises nozzles 18 arranged at the bottom side thereof and being directed such that soil supplied to the floor section is reduced to slime by means of the supplied water.

As may be seen from FIG. 1 the closed floor sections 10 and 16 comprise stepped poritons 20 which are upwardly inclined towards the outlet. Moreover, the casing is supported to be movable in a manner indicated by arrow 19 such that it can be shaken or vibrated along the direction of arrow 19 by means of a known shaking apparatus or vibrator (not shown). The soil supplied through the supply or feed 4 is thus transported across the floor towards the discharge means 5. The contiguous movable floor, as seen in both FIGS. 1 and 2 inclines upwardly from the soil inlet and to the outlet end.

Figure 2:
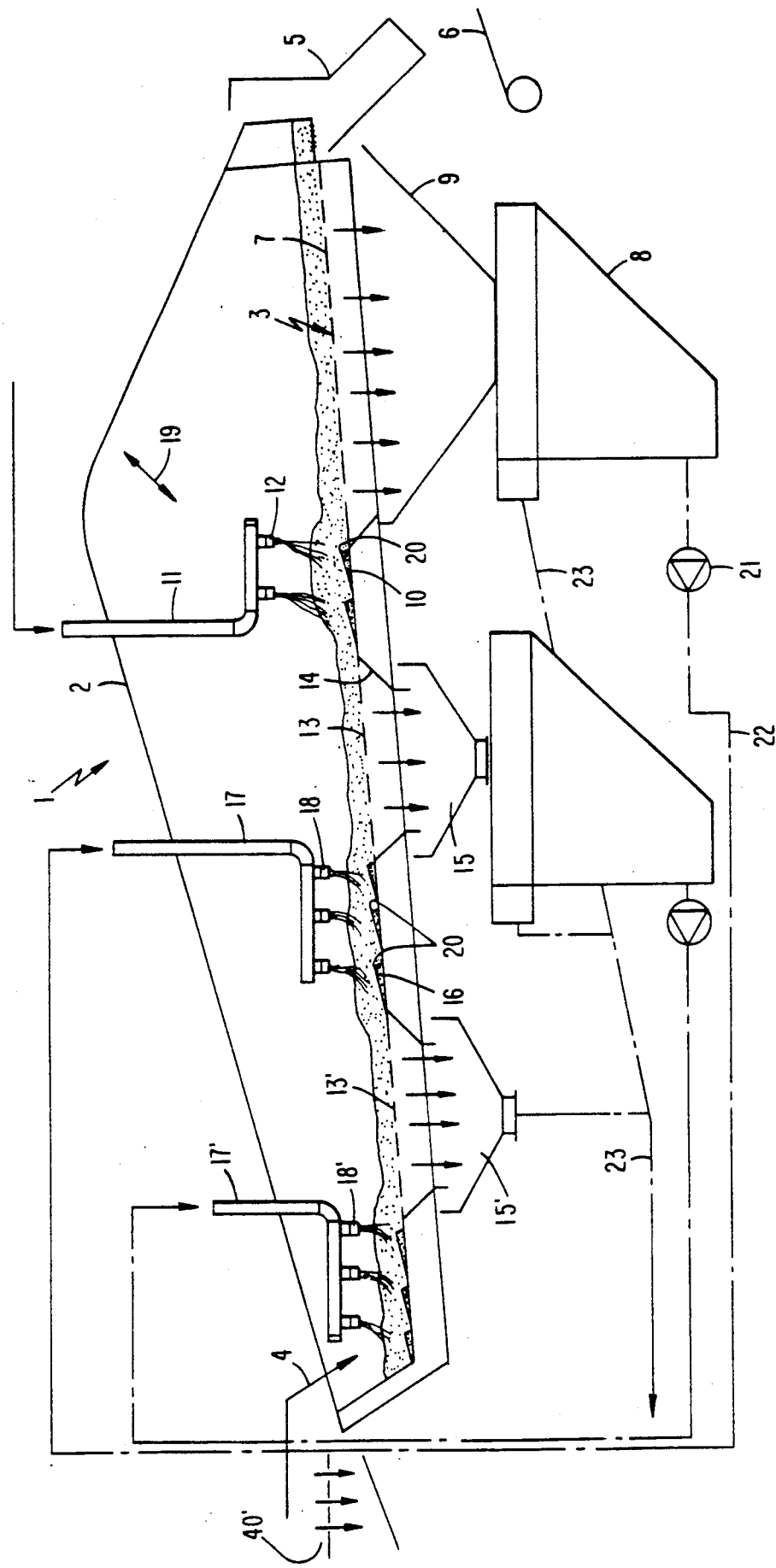

The outlet of the water collecting tank 8 is connected with the water supply 17 through a pump 21 and a conduit 22. The outlet of the collecting tank 15 is connected through a conduit 23 with a water processing plant (not shown) which supplies the water, after processing thereof, to the supply 11.

in the above-described embodiment per FIG. 1, only two pairs of sieve regions and associated closed floor sections are successively arranged in series. According to the embodiment illustrated in FIG. 2 a plurality of such regions may be arranged in series, wherein the water obtained from the successing sieve region is supplied to the respective preceding floor section, i.e., water supply 17' is provided to precede sieve region 13', as best seen in FIG. 2. A draining sieve 40' may be provided to remove any dirty water present in wet incoming soil.

In operation of the embodiment of FIG. 1 the soil to be processed is dumped into the casing 2 through the supply means 4. By means of a shaking or vibrating action of the floor 3 and due to the water supplied through the supply 17 the soil is reduced to a slime and is rinsed. In the following sieve region 13 the water containing harmful substances is separated from the remaining soil as far as possible. In the following floor section 10 the soil which now contains considerably less harmful substances is further reduced to slime with fresh water. The water containing harmful substances is separated from the purified soil in the first sieve region at the outlet side. The purified soil is discharged through the discharge means 5. Since in the first section 10 the fresh water contacts only such soil which has been prepurified, i.e., washed earlier, the water contains considerably less harmful substances than the water leaving the collecting tank 15. It is therefore well-suited for flushing the soil to be processed in the preceding region, which soil contains considerably more harmful substances, and is therefore supplied to this region at section 16.

In this manner, the soil is purified to a high extent by means of the cascade processing in which less fresh water is required, whereby the operating expenses and the load on the environment is reduced.

As may be best seen from FIGS. 1 and 2 floor regions comprise a shape which, as seen in a vertical section extending in transport direction from the inlet 4 to the outlet 5, is sawtooth-shaped with the respective small-angled leading edges of the sawteeth facing the inlet side and the steep trailing edges facing the outlet side. The soil is easily transported across the small-angled leading edge and drops down at the steep trailing edge, which prevents consolidation and improves the reduction of the soil to slime. As the motion of the floor moves the soil in one direction, the flow of water under gravity flows in the opposite direction and downwardly through the soil through the sieve regions of the moving floor as illustrated in both FIGS. 1 and 2. Thus the soil, as it is being washed in its passage from the inlet to the outlet, as best understood with reference to FIG. 1, moves in a generally upward direction in a continuous manner and is finally discharged into a soil discharge means at a point somewhat higher than the point at which it entered the apparatus. It should also be noted that the water flow over the closed floor sections 10 and 16 is directed counter to the flow of the material being washed.

Although the invention has been described with reference to a specific example embodiment, it is to be understood that it is intended to cover all modifications and equivalents within the scope of the appended claims.

What is claimed is:

1. Soil rinsing apparatus, comprising:
    means for rinsing and sieving a flow of soil;
    soil supply means at an inlet of the rinsing and sieving means and discharge means at an outlet thereof;
    a first sieve region with a used water collector arranged therebelow;
    a first water supply region preceding said first sieve region in the direction from said inlet to said outlet, receiving water from a fresh water supply;
    a second sieve region coplanar with and preceding said first sieve region and a second water supply region preceding said second sieve region, receiving water from a second water supply;
    an outlet of said used water collector connected with said second water supply for supplying used water thereto; and
    contiguous movable floor means of a predetermined shape, comprising said first and second coplanar sieve regions, the entirety of said floor means rising in the direction of soil movement from said inlet to said outlet, with said first and second water supply regions comprising, in a vertical section extending in the soil transport direction, a plurality of sawtooth-shaped surfaces each having respective small-angled leading edges of the teeth facing the inlet side and steep trailing edges facing the outlet side of the apparatus.

2. The soil rinsing apparatus of claim 1, further comprising:
    additional sieve regions and respective preceding water supply regions, each water supply region being supplied with used water collected in that sieve region which respectively follows the same in said outlet direction.

3. The soil rinsing apparatus of claim 1, further comprising:
    a draining sieve preceding said soil rinsing apparatus, to drain from incoming soil any impure water carried therein.

* * * * *